(12) United States Patent
Götz et al.

(10) Patent No.: US 10,780,789 B2
(45) Date of Patent: Sep. 22, 2020

(54) CHARGING APPARATUS

(71) Applicant: Dr. Ing. h.c. F. Porsche Aktiengesellschaft, Stuttgart (DE)

(72) Inventors: Stefan Götz, Forstern (DE); David Köhler, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 363 days.

(21) Appl. No.: 15/835,544

(22) Filed: Dec. 8, 2017

(65) Prior Publication Data

US 2018/0162228 A1 Jun. 14, 2018

(30) Foreign Application Priority Data

Dec. 9, 2016 (DE) .................. 10 2016 123 923

(51) Int. Cl.
| | |
|---|---|
| *H02J 7/00* | (2006.01) |
| *B60L 53/20* | (2019.01) |
| *B60L 11/18* | (2006.01) |
| *H02J 7/34* | (2006.01) |
| *H02J 1/12* | (2006.01) |
| *H02J 1/10* | (2006.01) |
| *B60L 53/31* | (2019.01) |
| *H02J 5/00* | (2016.01) |
| *B60L 53/62* | (2019.01) |

(52) U.S. Cl.
CPC ........... *B60L 53/20* (2019.02); *B60L 11/1811* (2013.01); *B60L 53/31* (2019.02); *B60L 53/62* (2019.02); *H02J 1/108* (2013.01); *H02J 1/12* (2013.01); *H02J 5/00* (2013.01); *H02J 7/0027* (2013.01); *H02J 7/34* (2013.01); *B60L 2210/10* (2013.01); *B60L 2210/30* (2013.01); *Y02T 10/7055* (2013.01)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS

| | | | |
|---|---|---|---|
| 7,768,229 B2 | 8/2010 | Zhang et al. | |
| 2010/0116571 A1* | 5/2010 | Suzuki ................. | B60W 10/26 180/65.25 |
| 2011/0101915 A1* | 5/2011 | Mitsutani ............. | B60L 3/0046 320/109 |
| 2012/0074901 A1 | 3/2012 | Mohammed | |
| 2012/0181873 A1* | 7/2012 | Butzmann ............ | H01M 10/425 307/82 |

(Continued)

FOREIGN PATENT DOCUMENTS

EP 28150131 A1 12/2014

OTHER PUBLICATIONS

German Search Report for German Application No. 10 2016 123 923.2, dated Sep. 11, 2017 with partial English translation, 7 Pages.

*Primary Examiner* — Arun C Williams
(74) *Attorney, Agent, or Firm* — RatnerPrestia (57) ABSTRACT

A charging apparatus for charging at least one electric energy storage, in particular of motor vehicles, comprising a plurality of charging units, each charging unit having an AC/DC converter, a DC interlink circuit, a high-voltage energy storage and a DC/DC converter, wherein the charging units can be connected up on the output side as needed.

10 Claims, 5 Drawing Sheets

(56) References Cited

U.S. PATENT DOCUMENTS

| | | | |
|---|---|---|---|
| 2012/0286706 A1* | 11/2012 | Ohkura | B60L 3/0007 |
| | | | 318/139 |
| 2013/0026979 A1* | 1/2013 | Endo | H02J 7/0068 |
| | | | 320/107 |
| 2013/0271064 A1* | 10/2013 | Ueno | H02J 7/342 |
| | | | 320/103 |
| 2016/0362012 A1* | 12/2016 | Yao | B60L 11/1811 |

* cited by examiner

Fig. 10

CHARGING APPARATUS

CROSS-REFERENCE TO RELATED APPLICATIONS

This application claims priority to German Patent Application No. DE 10 2016 123 923.2, filed Dec. 9, 2016, which is incorporated by reference herein in its entirety.

FIELD OF THE INVENTION

The invention relates to a charging apparatus, in particular for charging electric energy stores, in particular of motor vehicles.

BACKGROUND OF THE INVENTION

Electric vehicles or hybrid vehicles with an electric drive, for example so-called plug-in hybrid vehicles, overall also designated as electrically operated vehicles, have electric energy stores which, before the motor vehicle is driven, can be charged up electrically in order subsequently to be able to feed and therefore to operate the electric motor of the motor vehicle from the electric energy store.

Here, repeated charging operations of the electric energy store of the electrically operated vehicle are necessary, such as usually take place at a charging pole or charging station. Charging can also be carried out at a conventional alternating voltage or three-phase socket.

In a corresponding way, electrically operated vehicles generally permit two charging modes, a first AC charging mode and a second DC charging mode.

For AC charging at a conventional AC or three-phase socket, an electrically operated vehicle usually has a dedicated charging device, a so-called on-board charging device, which both performs the necessary conversion into direct current and also controls the charging operation. This AC charging mode is highly restricted in terms of charging rate, however, on account of the available connected power with, typically, no more than 16 A or 32 A charging current, and on account of the installation of the charging device. This results in charging times of several hours for each 100 km of possible electrically driven driving distance.

Here, so-called DC charging is known as a DC charging mode, in which the alternating current provided from the power supply is converted into direct current by the charging pole or charging station, and the high-voltage battery of the vehicle is charged therewith.

However, in many households or companies, such as in particular in car dealerships, there is often no mains connection available with the output necessary for charging a vehicle or several vehicles.

In the prior art, the solution to this problem in which an additional energy store is incorporated into the charging output electronics of the charging pole or the charging station is known. However, these known solutions have disadvantages with respect to the efficiency and the component costs, above all the different output requirements for the current demand in the household or in companies, as opposed to the output requirements for the charging of energy stores in motor vehicles, leading to problems.

U.S. Pat. No. 7,768,229 B2, which is incorporated by reference herein, discloses a charging system for electric vehicles, in which a supply system connected to the AC power supply is provided with a galvanically isolated AC/DC converter. This AC/DC converter supplies one or more charging systems, which each comprise a battery system and a control module, which in turn feeds the DC/DC charging electronics for charging an electric vehicle.

US 2012/0074 901 A1, which is incorporated by reference herein, discloses a central charging station for electric vehicles, which has a bidirectional AC/DC converter, an energy store and a plurality of charging connections.

The charging apparatuses known in the prior art still have disadvantages.

SUMMARY OF THE INVENTION

It is therefore the object of the present invention to devise a charging apparatus which reduces or avoids the disadvantages of the prior art and permits improved and faster charging of electric energy stores.

The object with regard to the drive unit is achieved by the features of claim 1.

An example embodiment of the invention relates to a charging apparatus for charging at least one electric energy store, in particular of motor vehicles, comprising a plurality of charging units, wherein each charging unit has an AC/DC converter, a DC interlink circuit, a high-voltage store and a DC/DC converter, wherein the charging units can be connected up on the output side as needed. As a result, charging that is adapted to the demand and to the availability with nevertheless a high charging rate and a high charging current or charging voltage can be performed.

It is particularly advantageous if the charging units are implemented substantially identically. As a result, by means of a same-part strategy, the component diversity can be reduced and the costs can also be lowered.

It is particularly advantageous if the charging units can be connected up in parallel and/or in series on the output side, wherein in particular at least some of the charging units can be connected up in series. As a result, depending on the demand, different output voltages and/or output currents for the charging can be generated.

It is also particularly advantageous if the AC/DC converter on the input side is arranged in the charging unit and on the input side can be connected to an AC voltage source. As a result, the charging unit can be used in a manner adapted to different power sources.

Likewise, it is also expedient if the DC interlink circuit is arranged downstream of the AC/DC converter and is fed by the AC/DC converter. As a result, given galvanic isolation by the AC/DC converter, the DC interlink circuit can be operated in a manner isolated galvanically from the power source, which no longer needs any galvanic isolation connected downstream.

It is also particularly advantageous if the high-voltage energy storage is connected up to the DC interlink circuit, in such a way that the high-voltage energy storage can output electrical energy to one DC interlink circuit and can pick up electrical energy from the one DC interlink circuit.

Likewise, it is particularly advantageous if the DC/DC converter is connected up on the output side to a DC interlink circuit, in such a way that the DC/DC converter outputs electrical energy from the one DC interlink circuit to an output terminal pair. As a result, the DC/DC converter can pass on the output voltage directly or connected in parallel or connected in series for charging.

It is also particularly advantageous if the output terminals can at least partly be disconnected or connected via switches. The switches are preferably electronically switchable under control and/or if appropriate also manually switchable. As a result, a special safety aspect can be implemented and adaptation of the wiring can be carried out, in particular also during the operation of the charging apparatus.

It is also advantageous if the output terminals can at least partly be connected to or disconnected from one another electrically in parallel or in series by switches. As a result, a particular safety aspect can be implemented and adaptation of the wiring can be carried out, in particular also during the operation of the charging apparatus.

It is particularly advantageous if the number of charging units is two, three, four, five, six or more.

BRIEF DESCRIPTION OF THE DRAWINGS

In the following text, the invention will be explained in detail by using example embodiments and with reference to the drawing, in which.

DETAILED DESCRIPTION OF THE INVENTION

Figure 1:
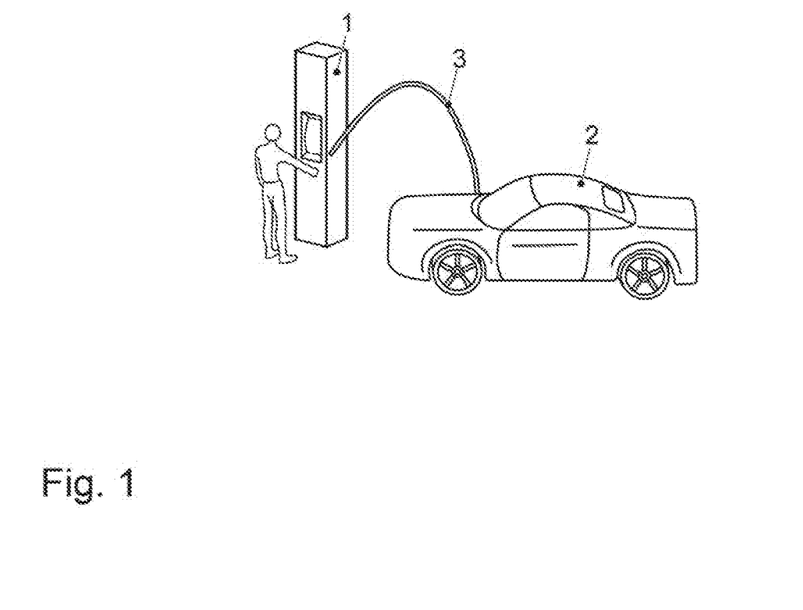
FIG. 1 shows a schematic illustration of a motor vehicle with charging apparatus.

The invention relates to a charging apparatus, such as, for example, a charging pole or a charging station. FIG. 1 shows, schematically, such a charging apparatus 1 in the form of a charging pole, for charging an electric energy store of a motor vehicle 2. For this purpose, the motor vehicle 2 is connected to the charging apparatus 1 by a connecting cable 3.

Figure 2:
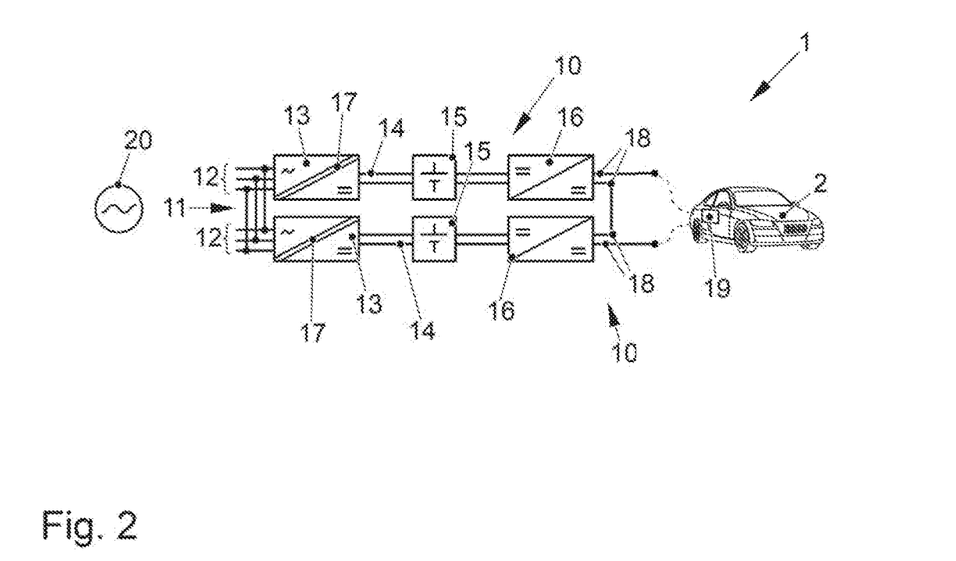
FIG. 2 shows an illustration of an embodiment of a circuit of a charging apparatus.

The charging apparatus 1 according to aspects of the invention for charging at least one electric energy store, in particular of a motor vehicle, is formed such as illustrated schematically in an embodiment in FIG. 2.

The charging apparatus 1 has a plurality of charging units 10, which are connected up in parallel and/or in series with one another. On the input side, the charging units are connected up in parallel. To this end, the charging units 10 are each provided with three terminals 12, in order for example to be connectable to a three-phase connection or an AC connection. The three terminals 12 of the respective charging unit 10 are each connected electrically to one another via connections 11, so that the respective terminal 12 of the one charging unit 10 is connected electrically to the corresponding terminal 12 of the other charging unit 10.

The charging units 10 each have an AC/DC converter 13, a DC interlink circuit 14, a high-voltage energy storage 15 and a DC/DC converter 16. The AC/DC converter is galvanically decoupled between the AC stage and the DC stage. The galvanic isolation is symbolized by the designation 17.

The number of charging units 10 is two or more. In the embodiment of FIG. 2, only two charging units 10 are shown but more than two charging units 10 can also be provided. On the output side, the charging units 10 can be connected up as required. To this end, the charging units 10 have output terminals 18, which can be connected to an energy storage 19, for example of a motor vehicle 2, or to one another. In the embodiment of FIG. 2, in each case one output terminal 18 of an output terminal pair is connected to the energy storage 19, the respective other output terminal 18 of an output terminal pair being connected to an output terminal 18 of the other output terminal pair.

Particularly preferably, the charging units 10 are constructed substantially identically. This means that the charging units 10 preferably comprise the same elements.

FIG. 2 shows that the at least two charging units 10 can be connected up in parallel and/or in series on the output side, wherein in particular at least some of the charging units 10 can be connected up in series. As a result, the charging power needed for the respective electric energy storage 19 at the necessary charging voltage can at least substantially be achieved.

FIG. 2 also shows that the respective AC/DC converter 13 on the input side is arranged in the respective charging unit 10 and on the input side can be connected to an AC voltage source 20. The respective DC interlink circuit 14 is arranged downstream of the respective AC/DC converter 13 and is fed by the respective AC/DC converter 13.

The respective high-voltage energy storage 15 is connected up to the respective DC interlink circuit 14, in such a way that the high-voltage energy storage 15 can output electrical energy to the DC interlink circuit 14 and, in particular with a time offset, can pick up electrical energy from the DC interlink circuit 14.

The respective DC/DC converter 16 is connected up on the output side to the DC interlink circuit 14, in such a way that the DC/DC converter 16 outputs electrical energy from the DC interlink circuit 14 to an output terminal pair 18.

FIG. 2 therefore shows an embodiment in which the charging apparatus, such as in particular the charging power electronics of the charging apparatus 1, is subdivided or broken down into a multiplicity of identical individual modules, the charging units 10, which each have an AC/DC converter 13, a DC interlink circuit 14, a high-voltage energy storage 15 and a DC/DC converter 16. Galvanic isolation 17 or decoupling, in particular between vehicle and power supply, is implemented in the AC/DC converters 13. By means of flexible wiring of these individual modules, the charging units, at least virtually any output requirement for charging an electric energy storage can be represented, in particular if the number of charging units is two or more, in particular also three, four, five, six or more.

The advantages of the charging apparatus 1 according to aspects of the invention is that the discrepancy between at least temporarily low power limitations of the grid connection but high instantaneous power demand for the rapid charging of an energy storage of a vehicle is overcome. The energy withdrawal of electrical energy from the grid can depend on the maximum power limit of the grid access point, the time-variable reduction in this power as a result of other loads at the same grid access point and, if appropriate, also on grid tariff plan properties of the connection, e.g., where charges depend on instantaneous total output.

In the embodiment of FIG. 2, it is also advantageous that there is galvanic isolation of high-voltage batteries and the DC charging cables, and thus the battery terminals of the vehicles that are connected thereto, from ground and between DC charging cables of different vehicles.

The charging apparatus 1 according to aspects of the invention permits adaptation of the voltage of storage batteries and the voltage requirements on the DC interlink circuit or circuits. For example, despite a high necessary charging voltage of, for example, 1000 V in vehicles, batteries with voltages of for example around 400 V, which are available in high numbers and at beneficial prices both new and possibly also used, can also be used as high-voltage energy storages 15.

As a result of the modularity of the charging apparatus 1 by the combination of a plurality of charging units 10, the concept permits dynamic range switching in voltage and current, in order to increase the voltage in steps, for example at the expense of the current. This stepped range switching can also be used and performed during a charging operation.

For example, at the start of the charging operation, typically a low voltage but a high current is needed, while toward the end of the charging operation, the necessary voltage rises as the current falls.

The respective AC/DC converter 13 can preferably convert alternating or three-phase energy to DC voltage and at the same time provide galvanic isolation between the input and the output.

The DC voltage is preferably generated by means of the AC/DC converter 13 under current and/or voltage control. It is preferably under both current and voltage control. In each case, the lower limiting value can be active, for example in a cascade control system having an internal voltage controller and an external current controller.

The DC/DC converter 16 is preferably a step-down converter, so that the voltage generated by the DC/DC converter 16 at the output terminal pair 18 is lower than the voltage of the associated DC interlink circuit 14.

The at least one output terminal pair 18 constitutes the at least one output terminal pair 18 of the charging apparatus.

Because of the galvanic isolation 17 in the AC/DC converters 13, the inputs of the AC/DC converters 13 can be supplied from the same energy supply network. Furthermore, there is advantageously no danger either of a galvanic connection between vehicles which are charged at different charging apparatuses, since these are isolated from one another by the galvanic isolation of the AC/DC converters 13.

Figure 3:
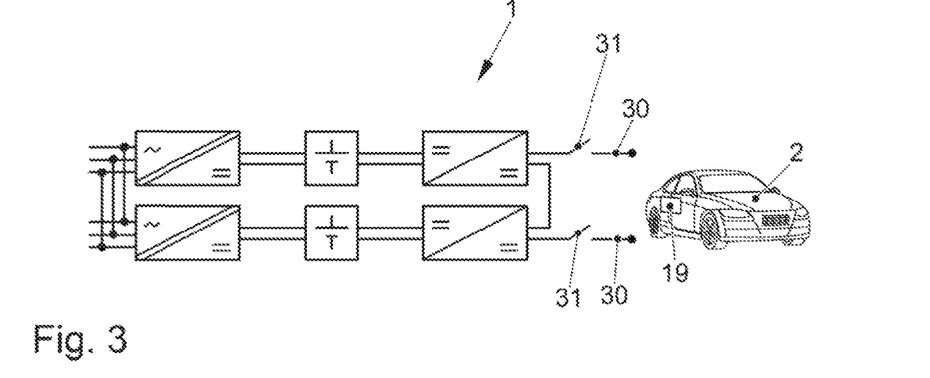
FIG. 3 shows an illustration of an embodiment of a circuit of a charging apparatus.

FIG. 3 shows a charging apparatus according to FIG. 2, wherein switches 31 are arranged in the connecting lines 30 for connecting the energy storage 19 of the motor vehicle 2. These switches 31 are used to be able to isolate the vehicle 2 from the charging apparatus 1. At least one of the connecting lines 30 can also or alternatively comprise contactors and/or fuses. The switches 31 or contactors are preferably open except in the charging mode if a desired charging current not equal to 0 is flowing.

Figure 4:
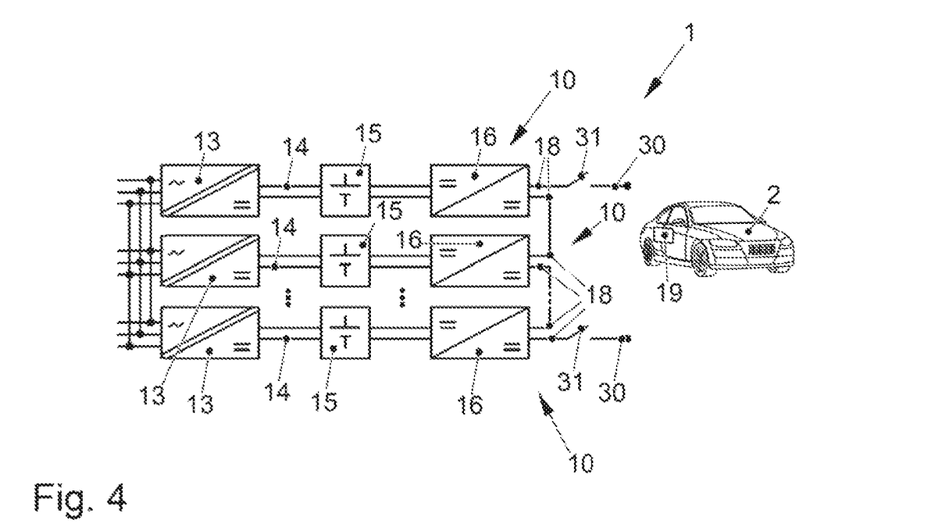
FIG. 4 shows an illustration of an embodiment of a circuit of a charging apparatus.

FIG. 4 shows another embodiment of a charging apparatus 1 according to aspects of the invention, wherein, in comparison with the embodiment of FIG. 2, three charging units 10 are provided.

The first charging unit 10 is connected by an output terminal 18 to the energy storage 19 of the motor vehicle, while the other output terminal 18 of the first charging unit is connected to the second charging unit 10. The second charging unit 10 is connected on the other side to the third charging unit 10. The third charging unit 10 is connected by its second output terminal 18 to the energy storage 19.

The second charging unit 10 is connected by its first output terminal 18 to an output terminal 18 of the first charging unit 10 and by its second output terminal 18 to an output terminal 18 of the third charging unit 10.

In principle, the arrangement according to FIGS. 2 and 4 can be expanded to a number N of charging units, where N=2, 3, 4, 5, 6 or even more.

Figure 5:
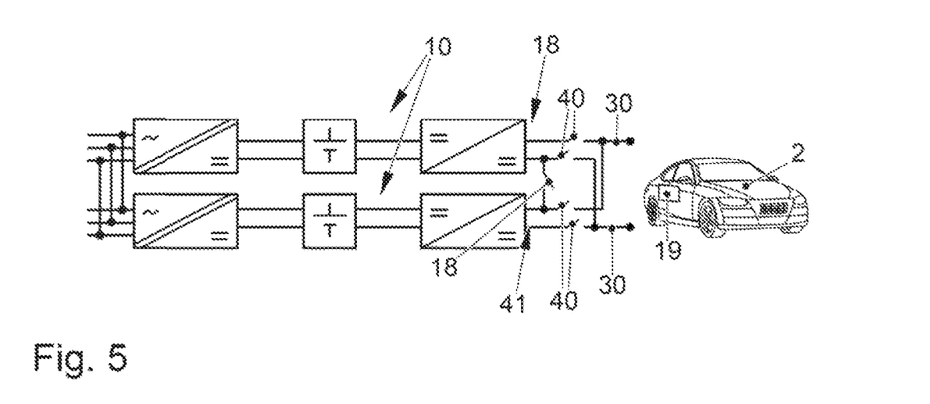
FIG. 5 shows an illustration of an embodiment of a circuit of a charging apparatus.

FIG. 5 shows a charging apparatus according to FIG. 2 or FIG. 3, wherein each of the output terminals 18 is provided with a switch 40. The first output terminals 18 are coupled to one another when the relevant switches 40 are closed. The second output terminals 18 are also coupled to each other when the relevant switches 40 are closed. Furthermore, the second output terminal of the first charging unit 10 can be connected to the first output terminal of the second charging unit 10 by means of the switch 41.

Figure 6:
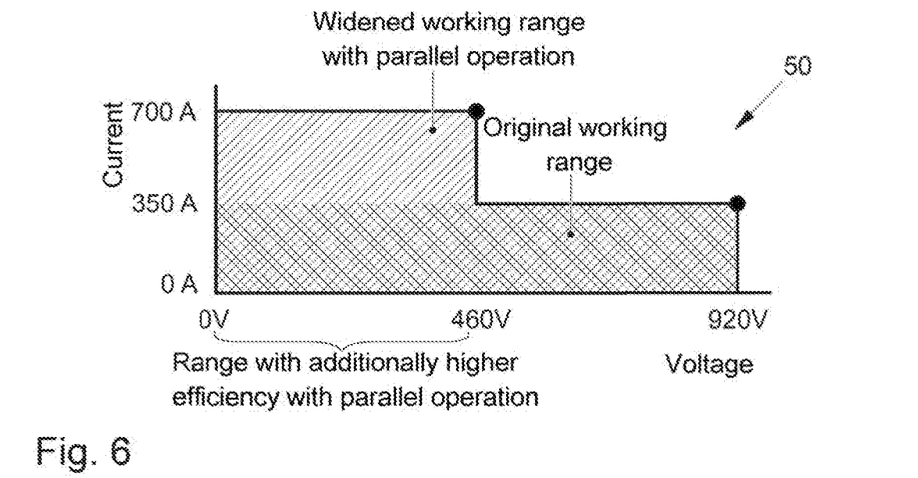
FIG. 6 shows a diagram to explain the invention.

In this regard, FIG. 6 shows a current-voltage diagram 50, in which the changeover from normal operation to parallel operation is illustrated. If the charging units 10 of FIG. 5 are parallel-connected, a high charging current can be achieved at low voltage. In the event of serial connection of the charging units 10, a lower current can be achieved at higher voltage.

Figure 7:
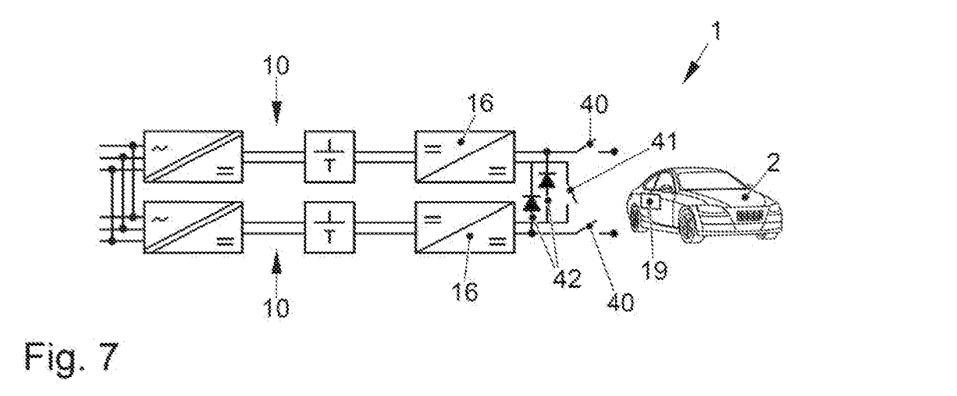
FIG. 7 shows an illustration of an embodiment of a circuit of a charging apparatus.

FIG. 7 shows another embodiment corresponding to the embodiment of FIG. 5, in which two of the five switches 40, 41 of FIG. 5, also called contactors, are replaced by semiconductor switches 42. The switches 40, 41 are preferably mechanical switches.

In FIG. 7, two of the switches are replaced by passive diodes as semiconductor switches 42. It is advantageous that, with regard to their blocking voltage, the semiconductor switches 42 have to be designed only for the maximum output voltage of one of the DC/DC converters 16.

Figure 8:
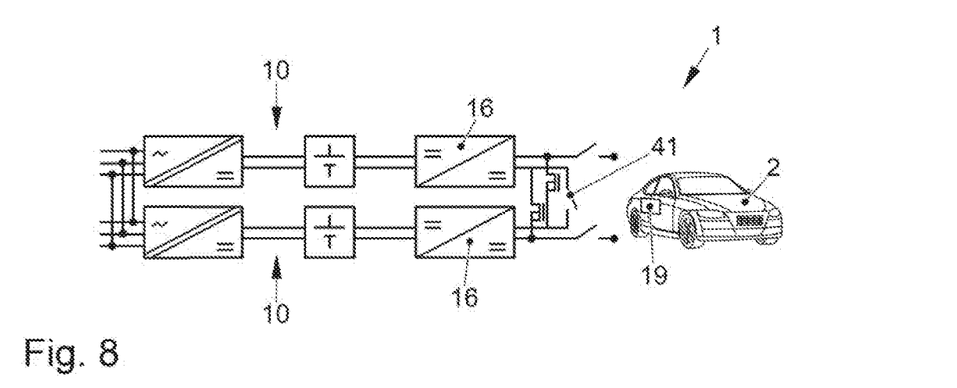
FIG. 8 shows an illustration of an embodiment of a circuit of a charging apparatus.

Alternatively, one of the diodes or both diodes can be replaced by active semiconductors 43, for example thyristors and IGBTs at high voltages, field effect transistors (FET) at low voltages, see FIG. 8. In particular, unipolar, majority-carrier-based semiconductor switches, for example FETs, offer the advantage of considerably lower power losses as compared with passive diodes.

Figure 9:
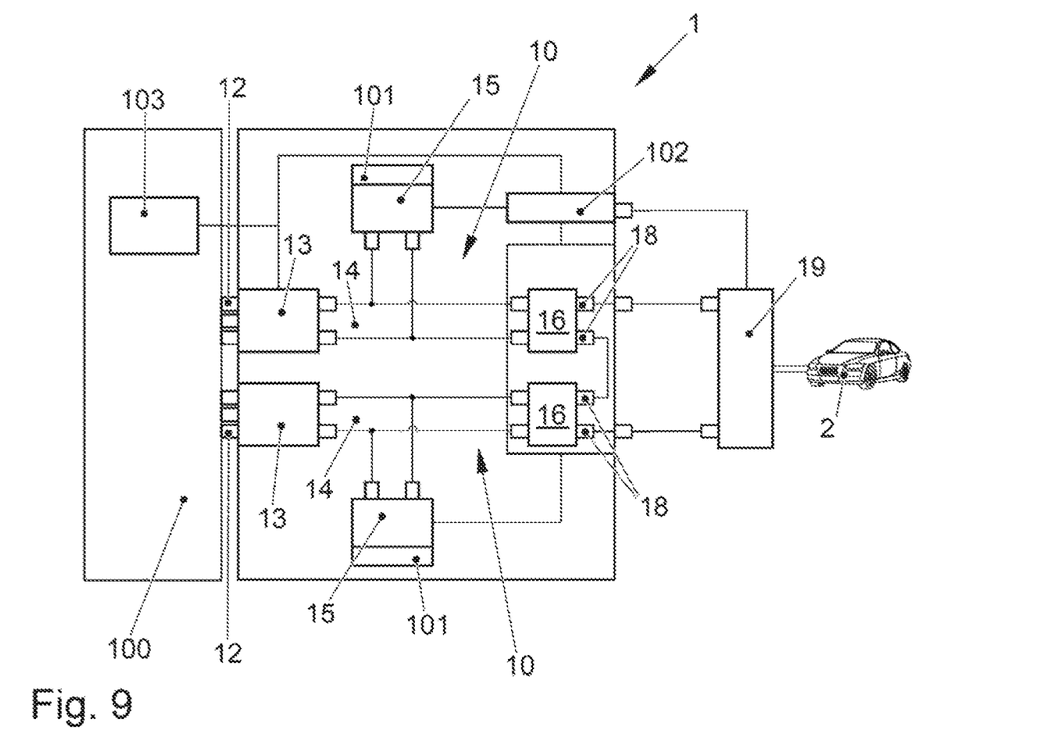
FIG. 9 shows an illustration of an embodiment of a circuit of a charging apparatus.

FIG. 9 shows, schematically, a charging apparatus 1 comprising a plurality of charging units 10, which are or can be connected up in parallel and/or in series with one another. On the input side, the charging units 10 are connected up in parallel and can be connected to a power supply 100. For this purpose, the charging units 10 are each provided with three terminals 12, in order for example to be connectable to a three-phase connection or an AC connection. The three terminals 12 of the respective charging unit 10 can optionally be connected electrically to one another via connections, so that the respective terminal 12 of the one charging unit 10 can be connected electrically to the corresponding terminal 12 of the other charging unit 10.

The charging units 10 each have an AC/DC converter 13, a DC interlink circuit 14, a high-voltage energy storage 15 and a DC/DC converter 16. The AC/DC converter 13 is galvanically decoupled between the AC stage and the DC stage.

The number of charging units 10 is two or optionally also more. In the embodiment of FIG. 9, only two charging units 10 are shown, but it is also possible for more than two charging units 10 to be provided. On the output side, the charging units 10 can be connected up as needed. For this purpose, the charging units 10 have output terminals 18, which can be connected to an energy storage 19, for example of a motor vehicle 2, or else to one another. In the embodiment of FIG. 2, in each case one output terminal 18 of an output terminal pair is connected to the energy store 19, the respective other output terminal 18 of an output terminal pair being connected to an output terminal 18 of the other output terminal pair.

Particularly preferably, the charging units 10 are constructed substantially identically. This preferably means that the charging units 10 comprise the same elements.

FIG. 9 shows that the at least two charging units 10 can be connected up in parallel and/or in series on the output side, wherein in particular at least some of the charging units 10 can be connected up in series. As a result, the charging output needed for the respective electric energy storage 19 at the necessary charging voltage can at least substantially be achieved.

FIG. 9 also shows that the respective AC/DC converter 13 on the input side is arranged in the respective charging unit 10 and, on the input side, can be connected to an AC voltage source 100 or a power supply. The respective DC interlink circuit 14 is arranged downstream of the respective AC/DC converter 13 and is fed by the respective AC/DC converter 13.

The respective high-voltage energy storage 15 is connected up to the respective DC interlink circuit 14 in such a way that the high-voltage energy storage 15 can output electrical energy to the DC interlink circuit 14 and, in particular with a time offset, can pick up electrical energy from the DC interlink circuit 14.

The respective DC/DC converter 16 is respectively connected up on the output side to the DC interlink circuit 14, in such a way that the DC/DC converter 16 outputs electrical energy from the DC interlink circuit 14 at an output terminal pair 18.

FIG. 9 therefore shows an embodiment in which the charging apparatus, such as in particular the charging power electronics of the charging apparatus 1, is subdivided or broken down into a multiplicity of identical individual modules, the charging units 10, which each have an AC/DC converter 13, a DC interlink circuit 14, a high-voltage energy storage 15 and a DC/DC converter 16. Galvanic isolation or decoupling 17, in particular between vehicle and power supply, is implemented in the AC/DC converters 13. By means of flexible wiring of these individual modules, the charging units 10, at least virtually any output requirement for charging an electrical energy storage 19 can be represented, in particular if the number of charging units is 2 or more, in particular also three, four, five, six or more.

The high-voltage energy storages can be cooled, for example, by an air-conditioning system or a refrigerant circuit 101.

Also optionally provided is a charging control unit 102 which controls a charging operation, for example in conjunction with an external control unit 103 such as an intelligent current sensor. Such an intelligent current sensor can, for example, monitor the instantaneous consumption of the electric connection, such as a domestic connection, and adapt the charging output adaptively to the current conditions, so that the charging output can be adapted to other loads, the connected power and/or time-variable costs and, if appropriate, can also be switched off or reduced if an overload is detectable. Such an intelligent current sensor can also be designated or understood as a home charging manager or generally as a charging manager.

Here, for example, the main function of the charging apparatus 1 is charging the internal energy storage, such as the high-voltage energy storage, and discharging the internal energy storage, such as the high-voltage energy storage, by charging one or more vehicles 2 or their respective electric energy storages 19.

The charging of electric energy storages 19 of vehicles 2 is substantially determined by the vehicle 2, including the output profile over time. The charging apparatus 1 optionally prescribes only maximum limits.

The charging of the internal energy storage, i.e. the high-voltage energy storage 15, is, however, substantially freely controllable and limited only by some constraints, such as by the connected power, the current power consumption of other devices on the same connection, a possible energy plan or energy tariff plan with potentially variable energy costs, etc.

The control system or the control unit 102 of the charging apparatus 1 coordinates the charging and discharging of the internal energy storage or the high-voltage energy storage 15.

On the output side of the charging apparatus 1, toward the vehicle 2, the charging operation can take place as described below.

A charging operation can be requested. The charging apparatus 1, also called a fast-charge unit, determines from the current state of charge of the internal high-voltage energy storage 15, its temperature and history, such as in particular an ageing state, the maximum power that can be output, and reports this to the vehicle 2 requesting the power limits, in particular with voltage and current limit, via a communication channel in the charging cable. After the request from the vehicle 2 for specific current and voltage conditions and the structure of the charging operation, these are accordingly output.

On the basis of a plurality of internal high-voltage energy storages 15 and separate DC/DC converters 16, the power withdrawal can be displaced between these high-voltage energy storages 15 in order, in the event of unequal output limits of the internal high-voltage energy storages 15, not to have to use the limits of the weakest energy storage for the charging of the vehicle 2, but instead to be able to operate each high-voltage energy storage 15 as far as possible to its individual maximum.

On the input side of the charging apparatus 1, the charging method can take place as follows:

The control unit 102 determines the maximum charging output for the high-voltage energy storage 15 from the maximum connection output, the output otherwise withdrawn and cost limits in the event of variable power tariffs.

Figure 10:
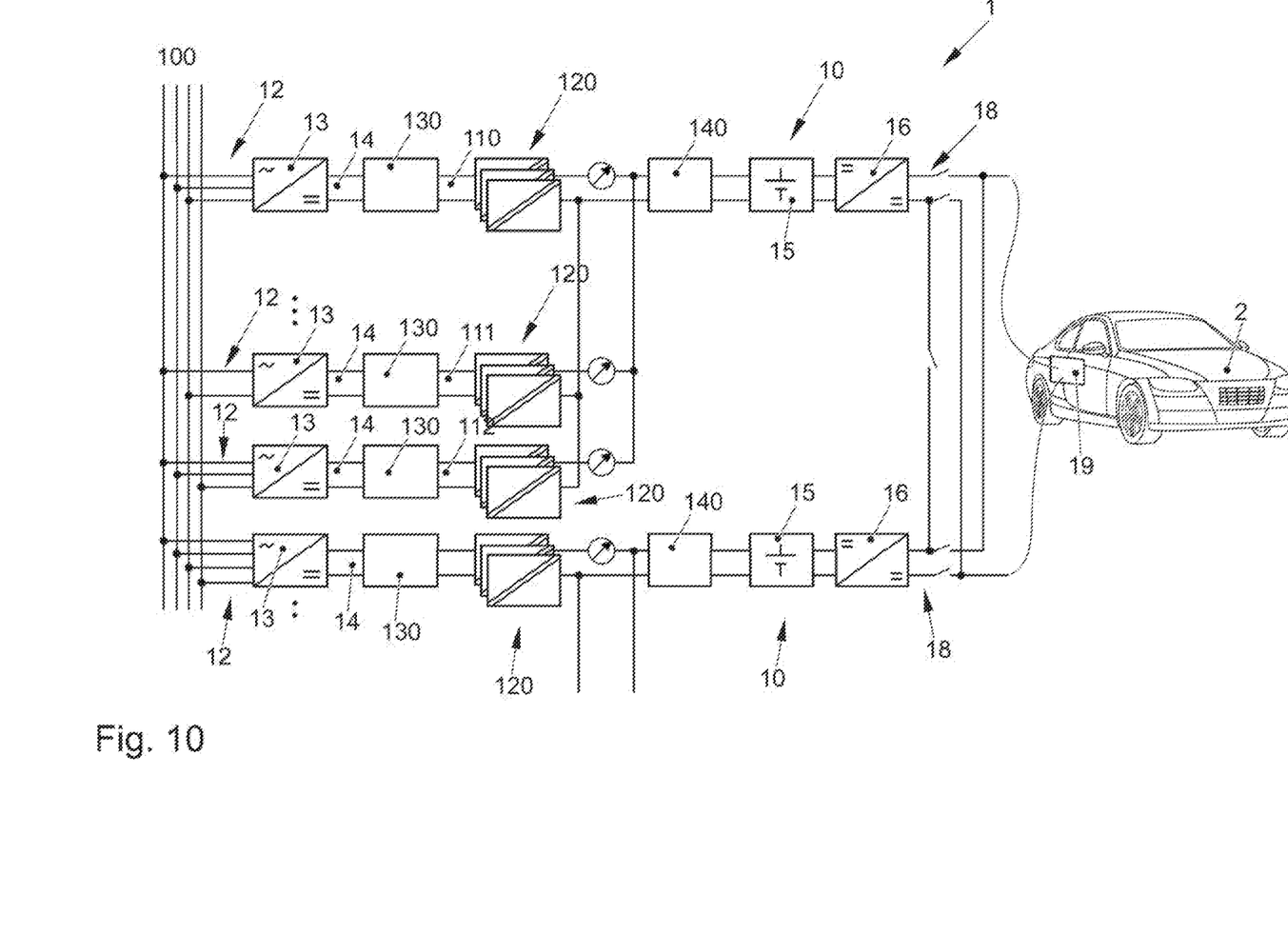
FIG. 10 shows an illustration of an embodiment of a circuit of a charging apparatus.

FIG. 10 shows, schematically, another embodiment of a charging apparatus 1 having a plurality of charging units 10, which are or can be connected up in parallel and/or in series with one another. On the input side, the charging units 10 are connected up in parallel and can be connected to a power supply 100 having N phases. For this purpose, the charging units 10 are each provided with two, three or four terminals 12, in order for example to be connectable to a three-phase connection or an AC connection having N phases. The three terminals 12 of the respective charging unit 10 can optionally be connected to one another via connections, so that the respective terminal 12 of the one charging unit 10 can be connected electrically to the corresponding terminal 12 of the other charging unit 10. In FIG. 10, wiring of four phases on the input side is provided, wherein respectively different phases are connected, so that multiphase DC/DC converters 120 are connected in the respective branches 110, 111, 112.

The charging units 10 each have an AC/DC converter 13, a DC interlink circuit 14, a high-voltage energy storage 15 and a DC/DC converter 16. A gain correction element 130 is connected downstream of the AC/DC converters 13. Also provided in the charging units is an optional filter 140. The multiphase DC/DC converter 120 is in each case decoupled galvanically between the DC stages.

The number of charging units 10 is two or optionally also more. In the embodiment of FIG. 10, only two charging units 10 are shown but more than two charging units 10 can also be provided. On the output side, the charging units 10 can be connected up as necessary. For this purpose, the charging units 10 have output terminals 18, which can be connected to an energy storage 19, for example of a motor vehicle 2, or to one another. In the embodiment of FIG. 2, in each case an output terminal 18 of an output terminal pair is connected to the energy storage 19, the respective other output terminal 18 of an output terminal pair being connected to an output terminal 18 of the other output terminal pair.

Particularly preferably, the charging units 10 are constructed substantially identically. This preferably means that the charging units 10 comprise the same elements.

FIG. 10 shows that the at least two charging units 10 can be connected up in parallel and/or in series on the output side, wherein in particular at least some of the charging units 10 can be connected up in series. As a result, the charging output needed for the respective electric energy storage 19 at the necessary charging voltage can at least substantially be achieved.

FIG. 10 also shows that the respective AC/DC converter 13 on the input side is arranged in the respective charging unit 10 and on the input side can be connected to an AC voltage source 100 or power supply. The respective DC interlink circuit 14 is arranged downstream of the respective AC/DC converter 13 and is fed by the respective AC/DC converter 13.

The respective high-voltage energy storage 15 is connected up to the respective DC interlink circuit 14 in such a way that the high-voltage energy storage 15 can output electrical energy to the DC interlink circuit 14 and, in particular with a time offset, can pick up electrical energy from the DC interlink circuit 14.

The respective DC/DC converter 16 is in each case connected up on the output side to the DC interlink circuit 14, in such a way that the DC/DC converter 16 outputs electrical energy from the DC interlink circuit 14 at an output terminal pair 18.

What is claimed is:

1. A charging apparatus for charging at least one electric energy storage of a motor vehicle, the charging apparatus comprising:

a plurality of charging units, each charging unit having an AC/DC converter, a DC interlink circuit, a high-voltage energy storage, and a DC/DC converter, wherein the charging units are configured to be interconnected on an output side each of the plurality of charging units comprises an output terminal on the output side, and further comprising an electrical connection connecting the output terminal of one of the plurality of charging units to the output terminal of another one of the plurality of charging units.

2. The charging apparatus as claimed in claim 1, wherein the charging units are constructed substantially identically.

3. The charging apparatus as claimed in claim 1, wherein the charging units can be connected at least one of in parallel or in series on the output side.

4. The charging apparatus as claimed in claim 1, wherein the AC/DC converter is arranged in the charging unit on an input side and wherein the input side can be connected to an AC voltage source.

5. The charging apparatus as claimed in claim 1, further comprising a DC interlink circuit arranged downstream of the AC/DC converter and fed by the AC/DC converter.

6. The charging apparatus as claimed in claim 1, wherein the high-voltage energy storage is connected to a DC interlink circuit such that the high-voltage energy storage can output electrical energy to the DC interlink circuit and can receive electrical energy from the DC interlink circuit.

7. The charging apparatus as claimed in claim 1, wherein the DC/DC converter is connected on the output side to a DC interlink circuit such that the DC/DC converter outputs electrical energy from the DC interlink circuit to an output terminal pair.

8. The charging apparatus as claimed in claim 1, wherein output terminals connected to the DC/DC converter can at least partly be disconnected or connected via switches.

9. The charging apparatus as claimed in claim 1, wherein output terminals connected to the DC/DC converter can at least partly be connected to or disconnected from one another electrically in parallel or in series by switches.

10. The charging apparatus as claimed in claim 1, wherein the number of charging units is one of two, three, four, five, six or more.

* * * * *